United States Patent Office 3,508,090
Patented Apr. 21, 1970

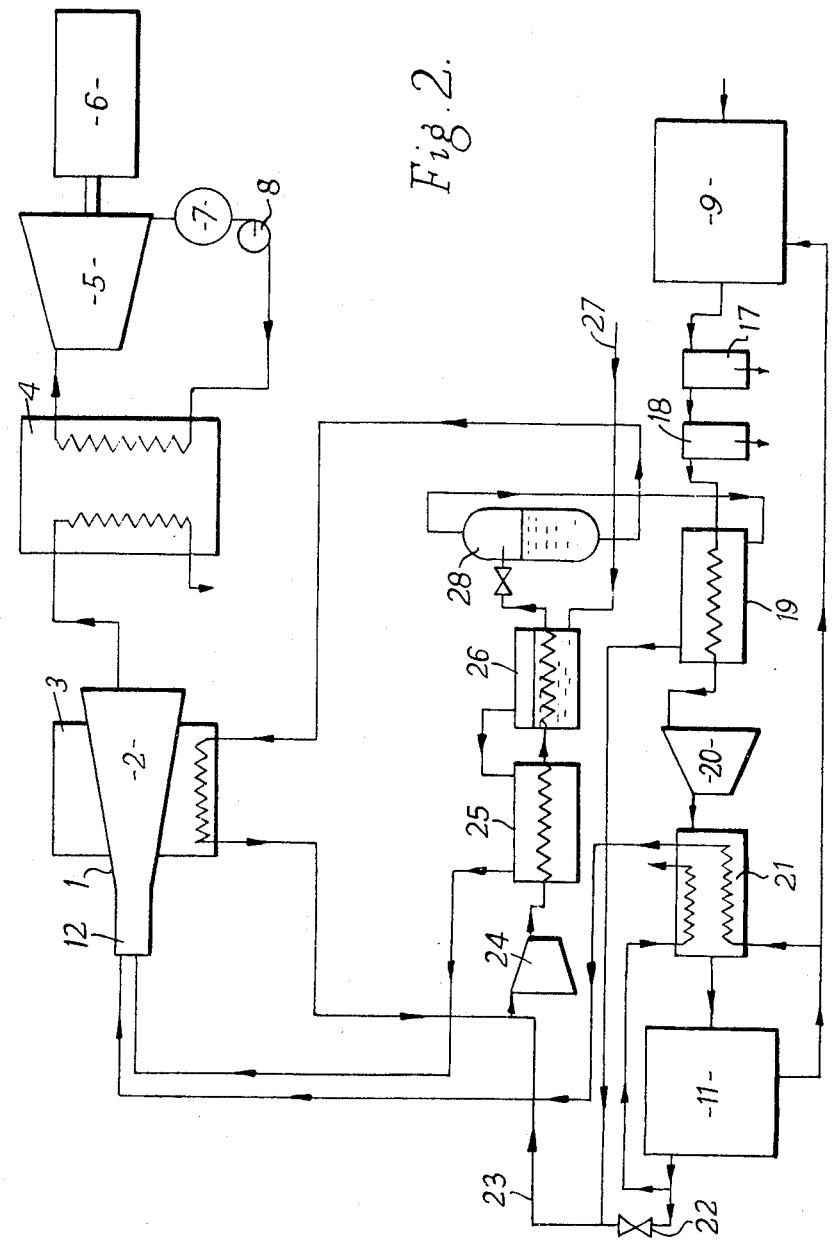

3,508,090
THERMAL POWER PLANTS
Felix Jeremy Philip Crampton and Terence Sidwell Wilkinson, Newcastle-upon-Tyne, England, assignors, by mesne assignments, to Conch International Methane Limited, Nassau, Bahamas, a company of the Bahamas
Filed July 7, 1965, Ser. No. 470,140
Claims priority, application Great Britain, July 7, 1964, 28,009/64
Int. Cl. G21d 7/02; H02k 45/00
U.S. Cl. 310—11                     2 Claims

ABSTRACT OF THE DISCLOSURE

A thermal power plant is disclosed in which a magnetohydrodynamic generator employs liquefied natural gas both for cooling of the generator and as a fuel for the generator. Exhaust gases from the generator are also used as a source of heat for a secondary thermal power cycle.

Figure 1:
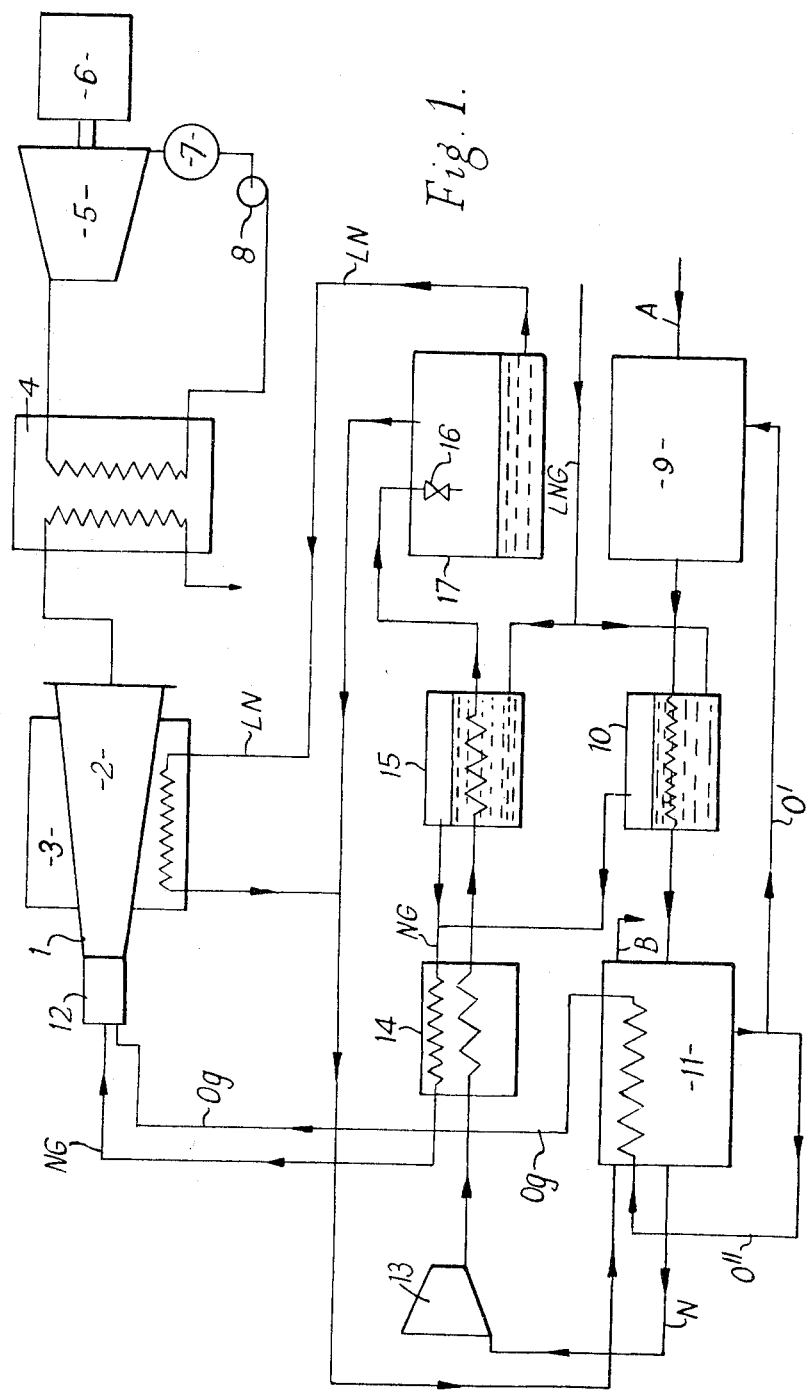

This invention relates to thermal power plants incorporating magnetohydrodynamic generators.

With present forms of open-cycle magnetohydrodynamic (MHD) power generators it is essential, from an efficiency point of view, to use the heat content of the exhaust gases leaving the generator in a further thermal power cycle. One possible use of such generators is with a conventional steam power cycle in which the heat content of the exhaust gas from the generator is used to raise steam to drive steam turbines in base load power stations.

Use of MHD generators of a power output sufficient for use with steam turbines of base load power stations means that some of the losses associated with such generators are quite substantial particularly losses associated with the field magnet, the compressor or compressors circulating combustion air through the generator and, if oxygen enrichment is used, with the separation unit used to remove oxygen from air.

Recent discoveries in many parts of the world of large reserves of natural gas have led to a growing interest in the utilisation of large quantities of liquefied natural gas, as it is in the liquefied form that natural gas is most commonly imported into countries without reserves of natural gas. The liquefied natural gas is subsequently gasified in the importing countries.

The object of the present invention is to provide a thermal power plant incorporating a magnetohydrodynamic generator which makes use of liquefied natural gas to improve its thermal efficiency.

In accordance with the invention there is provided a thermal power plant incorporating a magnetohydrodynamic generator, exhaust gases from which are used as a source of heat for a second thermal power cycle, in which plant liquefied natural gas is used in the cooling of coils producing the magnetic field of the magnetohydrodynamic generator and is then used as a fuel for the magnetohydrodynamic generator.

The liquefied natural gas may be used directly as the coolant for the coils of the magnet or an intermediary fluid may be used. Such an intermediary fluid may be a cryogenic fluid such as nitrogen, neon or helium the liquefaction of which may be assisted by the liquefied natural gas thereby allowing the cooling of the magnet coils in some instances to superconducting temperatures.

The liquefied natural gas which is evaporated during the process is available for use as a fuel, not only in the MHD generator but also in the second thermal power cycle.

If the MHD generator uses pure oxygen or oxygen-enriched air, the liquefied natural gas can also be used to improve the efficiency of plant used to obtain pure oxygen or air with enriched oxygen content. In one form air is pre-cooled in a water precipitator below the freezing point of water to remove its moisture content. The dried air is then further cooled by liquefied natural gas and passes to a liquefier in which the oxygen is liquefied and separated from the nitrogen content of the air. Part of the liquid oxygen is used to precipitate moisture in the air in the water precipitator and the remainder is gasified and then passes to a combustion chamber of the MHD generator. The nitrogen of the liquefier is compressed and liquefied by liquefied natural gas and then circulated through the coils of the magnet of the MHD generator.

A further feature of the invention is that if natural gas produced by evaporation of the liquefied natural gas in the cycle is used as fuel for a boiler in a steam turbine plant forming the said second cycle, the temperature of the smoke stack from the boiler can be reduced to a much lower level than with conventional fuels from the combustion product of which sulphuric acid may be produced. This enables more efficient heating of the feedwater to be achieved.

The invention will now be described by way of example with reference to the drawing in which:

FIG. 1 shows in diagrammatic form a thermal power plant in accordance with one embodiment of the invention, and FIG. 2 shows in diagrammatic form a thermal power plant in accordance with a second embodiment of the invention.

Referring to FIG. 1, a thermal power plant comprises an MHD generator 1 having a duct 2 through which ionized gas flows and electro-magnet 3 which produces a magnetic field across the duct. Gas leaving the duct passes to a boiler 4 where it is used to heat steam in a second power cycle comprising steam turbine 5, driving generator 6, condenser 7 and pump 8, before being passed to atmosphere. If the gas is seeded with say an alkalimetal vapour to assist ionization, the seeding material would be recovered in a separator, not shown, before the gas passes to atmosphere. Such a separator may be located before the boiler.

Generally speaking, liquefied natural gas can be used to cool the coils of magnet 3 directly or it can cool an intermediary fluid used to cool the magnet coils. In the form illustrated the liquid natural gas is used indirectly to cool the magnet coils, the intermediary fluid being liquid nitrogen which is derived from an oxygen separation process used to provide pure oxygen or air enriched with oxygen for the MHD generator.

Air is led through line A to a water precipitator 9 where it is cooled below the freezing temperature of water so that the moisture content of the air is precipitated and can be removed by mechanical means. The dried air is then further cooled by liquefied natural gas in heat exchanger 10 and then passes to a conventional liquefier 11 in which the oxygen is liquefied. The liquefaction of the oxygen enables it to be separated from the nitrogen content of the air. Part of the liquid oxygen is conveyed in line O' to the precipitator 9 where it is used to precipitate moisture in the air, whilst the remainder is recirculated through line O" to the liquefier 11 where it is reconverted to gas and is then coveyed in its gaseous form through line Og to combustion chamber 12 of the MHD generator.

The nitrogen is extracted in cold gaseous form from the liquefier 11 and is conveyed in line N to compressor 13, to heat exchanger 14 where it is cooled and then heat exchanger 15 where it is further cooled by liquefied natural gas from line LNG. It then expands through throttle valve 16 in vessel 17 where some of it liquefies. The liquid nitrogen then passes through line LN to the coil of magnet 3 to cool the coils and then passes to the oxygen liquefier 11 to assist in the liquefication of the oxygen. On leaving the liquefier 11 it passes to atmosphere through outlet B.

Liquefied natural gas evaporated in heat exchangers 10 and 15 passes through line NG to heat exchanger 14 and thence to combustion chamber 12 where it acts as a fuel. If sufficient quantities are available some of the gaseous natural gas from heat exchangers 10 and 15 can be used as a fuel in the boiler 4.

The liquid nitrogen will be evaporated in the magnet coils and gaseous nitrogen in the vessel 17 can join the nitrogen in line LN leaving the magnet coils and pass to liquefier 11.

The nitrogen returning to the liquefier 11 from the magnet coils and from vessel 17 has substantially the same temperature as the nitrogen leaving the liquefier to pass through compressor 13 and heat exchangers 14 and 15. In practice, therefore, the path of the nitrogen through the heat exchangers 14 and 15, liquefier 17 and magnet coils 3 could be a closed path. Nitrogen-separated air in the liquefier 11 could be used as make-up for the closed circuit when necessary.

Referring to FIG. 2 an alternative arrangement is shown in which heat exchange between liquefied natural gas and air is avoided.

As before air enters a water precipitator 9 where it is cooled below the freezing point of the water so that the moisture content of the air is precipitated and can be removed by mechanical means, for example in a cyclone separator 17. Carbon dioxide is removed in a vessel 18 and the air then enters a heat exchanger 19 where it is further cooled by cold nitrogen vapour. The pressure of the air is then raised in a compressor 20 and it then passes to a heat exchanger 21 where the heat of compression is removed by cold nitrogen gas derived from the liquefier 11 and also by liquid oxygen from the liquefier 11.

The cooled air then passes to the liquefier 11 where the oxygen is liquefied and separated from the nitrogen. Part of the liquid oxygen passes to the precipitator 9 to precipitate moisture in the incoming air and the remainder passes to the heat exchanger 21 to cool the air entering the liquefier 11 as explained above.

The nitrogen from the liquefier 11 passes to the heat exchanger 21 and then to atmosphere. Nitrogen can also pass under the control of a valve 22 into a closed nitrogen circuit 23 which contains the nitrogen used for cooling the coils of magnet 3. Nitrogen leaving the coil of the magnet 3 is compressed in a compressor 24 and then enters a heat exchanger 25 where it is cooled by natural gas. It then enters a heat exchanger 26 where it is liquefied by liquefied natural gas entering through a line 27. The liquefied nitrogen then enters an expansion vessel 28 where part of it evaporates. The liquid nitrogen from the vessel 28 passes to the coils of the magnet 3 whilst nitrogen vapour passes to the heat exchanger 19 to pre-cool the air on its way to the liquefier 11. After leaving the heat exchanger 19 it rejoins the nitrogen leaving the coil of the magnet 3 and enters the compressor 24 to repeat the cycle.

The liquefied natural gas enters through the line 27, is gasified in the heat exchanger 26, is further heated by nitrogen in the heat exchanger 25, and then passes to the combustion chamber 12 where it acts as fuel for the MHD generator. Some of the natural gas may also be used in the heater 4 if desired.

In the above cycle the liquefied natural gas is heated by contact with nitrogen only.

The use of natural gas as a fuel for the heater 4 in either of the above cycles has the added advantage that the temperature of the smoke stack from the boiler can be reduced to a much lower level than with conventional fuels from the combustion products of which sulphuric acid may be produced. The reduction in smoke stack temperature enables more efficient heating of the boiler feedwater to be achieved.

We claim:
1. A thermal power plant comprising magnetohydrodynamic generator; a second thermal power generator having a heat source supplied with heat from exhaust gases of the magnetohydrodynamic geneator; means for supplying liquefied natural gas in a gaseous state as fuel to a combustion chamber of said magnetohydrodynamic generator or to the heat source of said second thermal power generator or both; means for supplying pure oxygen or oxygen-enriched air to the combustion chamber of said magnethydrodynamic generator which means comprise an air drier in which the air is cooled by liquid oxygen to below the freezing point of water to cause precipitation of the moisture, mechanical means for separating ice particles from the air, means for removing carbon dioxide from the air, a first heat exchanger for further cooling the dried air, a compressor for compressing said air, a second heat exchanger for removing the heat of compression and further cooling the air, a first liquefier in which the oxygen in the air is liquefied, and means for conveying part of the liquid oxygen to the air drier and the remainder through the second heat exchanger and thence in gaseous form to the combustion chamber of the magnetohydrodynamic generator; means for conveying gaseous nitrogen from the said first liquefier to the second heat exchanger to assist in the cooling of the air and for use as make up for a nitrogen closed cycle, said closed cycle incorporating a nitrogen compressor, a nitrogen cooler, a nitrogen liquefier, an expansion vessel, the coils producing the magnetic field of the magnetohydrodynamic generator, and a conduit means for conveying the nitrogen through the compressor, the nitrogen cooler, the nitrogen liquefier, the expansion vessel and the said coils; means for conveying liquefied natural gas to said nitrogen liquefier, to cool the nitrogen and cause it to liquefy, thence in its gaseous state to the nitrogen cooler and finally to the combustion chamber of the magnetohydrodynamic generator, and means for conveying nitrogen vapour from said expansion vessel to the said first heat exchanger to cool the air.

2. A thermal power plant comprising:
a magnetohydrodynamic generator;
a second thermal power generator having a heat source supplied with heat from exhaust gases of said magnetohydrodynamic generator;
means for gasifying liquefied natural gas and supplying it as fuel to a combustion chamber of said magnetohydrodynamic generator;
means for supplying pure oxygen or oxygen-enriched air to the combustion chamber of said magnetohydrodynamic generator which means comprises an air dryer in which the air is cooled by liquid oxygen to below the freezing point of water to cause precipitation of the moisture, a first heat exchanger for further cooling of the dried air, a second heat exchanger constituting a first liquefier in which the oxygen in the air is liquefied, and means for conveying part of the liquid oxygen to the air dryer and the remainder through the second heat exchanger and thence in gaseous form to the combustion chamber of said magnetohydrodynamic generator;
means for conveying gaseous nitrogen from said first liquefier for use as make-up for a nitrogen closed cycle, said closed cycle incorporating a nitrogen compressor, a nitrogen cooler, a nitrogen liquefier, an expansion vessel, the coils producing the magnetic field of the magnetohydrodynamic generator, and conduit means for conveying the nitrogen through the nitrogen compressor, the nitrogen cooler, the nitrogen liquefier, the expansion vessel and the said coils;
means for conveying liquefied natural gas to said nitrogen liquefier to cool the nitrogen and cause it to liquefy, thence in its gaseous state to the nitrogen cooler and finally to the combustion chamber of said magnetohydrodynamic generator, and means for conveying nitrogen vapour from said expansion vessel to said second heat exchanger to cool the air.

References Cited

UNITED STATES PATENTS

| | | | |
|---|---|---|---|
| 3,264,501 | 8/1966 | Kantrowitz et al. | 310—11 |
| 3,320,443 | 5/1967 | Klein | 310—11 |
| 2,862,546 | 12/1958 | Klose et al. | 62—52 X |
| 3,058,314 | 10/1962 | Gardner | 62—29 |
| 3,069,847 | 12/1962 | Vest | 60—200 |
| 3,232,050 | 2/1966 | Robinson et al. | 60—36 |
| 3,239,697 | 3/1966 | Steakly | 310—11 |

DAVID X. SLINEY, Primary Examiner